(12) United States Patent
Ravishankar et al.

(10) Patent No.: US 8,943,508 B2
(45) Date of Patent: Jan. 27, 2015

(54) SERVICE ORIENTED COLLABORATION

(75) Inventors: Ram Ravishankar, Irvine, CA (US); Sham M. Vaidya, Troy, MI (US); Paul van Riel, Utrecht (NL)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 12/634,380

(22) Filed: Dec. 9, 2009

(65) Prior Publication Data

US 2011/0138394 A1 Jun. 9, 2011

(51) Int. Cl.
G06F 9/46 (2006.01)
G06F 15/16 (2006.01)
G01C 21/00 (2006.01)
G06Q 10/00 (2012.01)
G06F 9/50 (2006.01)

(52) U.S. Cl.
CPC .................................. *G06F 9/5038* (2013.01)
USPC ........... 718/102; 709/219; 709/205; 709/206; 701/451; 701/516; 701/517; 705/7.12; 705/7.21; 705/7.27; 705/300; 705/301

(58) Field of Classification Search
USPC .......... 718/100–106; 709/217–219, 225–229; 705/7.12–7.23, 300–301
See application file for complete search history.

(56) References Cited

U.S. PATENT DOCUMENTS

| | | | |
|---|---|---|---|
| 7,219,107 B2 | 5/2007 | Beringer | |
| 7,299,465 B2* | 11/2007 | Braun et al. | 718/100 |
| 7,472,349 B1* | 12/2008 | Srivastava et al. | 1/1 |
| 7,496,637 B2* | 2/2009 | Han et al. | 709/217 |
| 7,698,398 B1* | 4/2010 | Lai | 709/223 |
| 2002/0095321 A1* | 7/2002 | Hellbusch et al. | 705/7 |
| 2003/0236693 A1 | 12/2003 | Chen et al. | |
| 2004/0259534 A1* | 12/2004 | Chaudhari et al. | 455/414.1 |
| 2005/0096811 A1* | 5/2005 | Bodin et al. | 701/33 |
| 2005/0144226 A1 | 6/2005 | Purewal | |
| 2006/0195476 A1 | 8/2006 | Nori et al. | |
| 2007/0011126 A1 | 1/2007 | Conner et al. | |
| 2007/0136236 A1* | 6/2007 | Kussmaul et al. | 707/2 |
| 2007/0288250 A1 | 12/2007 | Lemcke et al. | |
| 2008/0103806 A1* | 5/2008 | Harris | 705/1 |
| 2009/0089379 A1 | 4/2009 | Pegg | |
| 2009/0113385 A1 | 4/2009 | Appleyard et al. | |
| 2009/0177768 A1* | 7/2009 | Kind et al. | 709/224 |
| 2011/0010432 A1* | 1/2011 | Uyeki | 709/219 |
| 2011/0022697 A1* | 1/2011 | Huh | 709/224 |

FOREIGN PATENT DOCUMENTS

CN 11256508 A 9/2008

OTHER PUBLICATIONS

"Service-oriented architecture for extended business collaboration", IBM Research, pp. 1-4, retrieved Aug. 7, 2009 http://domino.research.ibm.com/comm/research.nsf/pages/r.servcomp.innovation.html?Open&printable.

Tsai et al., "Ontology-based Dynamic Process Collaboration in Service-Oriented Architecture", Proceedings of the IEEE International Conference on Service-Oriented Computing and Applications, 2007, pp. 39-46.

* cited by examiner

*Primary Examiner* — Abdullah Al Kawsar (74) *Attorney, Agent, or Firm* — Yee & Associates, P.C.; Lisa J. Ulrich (57) ABSTRACT

When a service is requested at a platform in a collaborative services environment, a service orchestration engine accesses a service definition from a repository and schedules a number of tasks at a number of end points in accordance with a number of end point profiles and a number of policies associated with the end points.

19 Claims, 5 Drawing Sheets

SERVICE ORIENTED COLLABORATION

BACKGROUND

1. Field

The disclosure relates generally to data processing in a services oriented environment, and more specifically, to providing collaborative services through an engine and repository of agreed service definitions, end point profiles, and policies.

2. Description of the Related Art

Businesses interact with increasing numbers of related and unrelated businesses to collaborate on tasks for a customer. Running extended business to business operations creates a need for integration of an increased number of human interactions. Automation of the increased number of human interactions involves customers and third parties as well as business enterprise systems. In order for businesses and parties to interact they must collaborate, and automation of such collaboration is called collaborative services. One of the difficulties in extending automated interactions between businesses, third parties, and customers is that there is a lack of commonly shared knowledge regarding business semantics. Therefore, in order for interacting parties to properly use and understand exchanged information, human-assisted methods, such as phone calls, emails, and meetings are required, making the collaboration process inefficient and not cost effective.

Another difficulty in extending automated interactions involves integrating the plethora of communication tools available for social networking into the collaboration process in an efficient and cost effective manner. As used herein, social networking tools include such services as profiles, communities, blogs, bookmarking, and activities. A profiles service stores basic contact information, tags for expertise or interests, and can be synchronized with corporate directories or human resource applications. A community service provides online forums, discussion boards, shared bookmarks, and news feeds for users with a common area of interest. A blog service enables each person in a group to share his expertise and opinions using such tools as tag clouds, ratings of blog entries, notifications, and flagging of content. A bookmarking service enables a user to bookmark content inside or outside of a firewall and securely share those bookmarks with colleagues inside the firewall. An activities service provides a single web destination to store to-do lists, files, bookmarks, and messages for a group including RSS type feeds of updates and changes.

A suitable architecture for collaboration is the service oriented architecture (SOA). The service oriented architecture is a distributed computing system that can be expanded, is flexible, and that will work with legacy systems. In a service oriented architecture, software applications are built on basic components called services. A service is an abstract resource that represents a capability of performing tasks that form a coherent functionality from the point of view of suppliers, original equipment manufacturers, and customers. A service in a service oriented architecture has three properties. First, a contract to the service is independent of any particular platform. Second, the service can be dynamically located and invoked. Third, the service maintains its own state. A service oriented architecture supports describing and publishing the service, discovering a service, and consuming the service.

As the complexities of automated interactions between customers, businesses, and third parties increases, it is desirable to provide collaborative services in a cost efficient and effective manner. Accordingly, there is a need for a method and apparatus, which takes into account one or more of the issues discussed above as well as possibly other issues.

SUMMARY

According to one embodiment of the present invention, a method comprises: providing a number of service definitions in a registry connected to a platform; responsive to receiving a request for a service at the platform, identifying a service definition in a registry; responsive to identifying the service definition, accessing the service definition to determine a number of tasks and a number of end points, each of the number of end points having an end point profile; accessing a number of end point profiles, and responsive to a number of data in the end point profiles, enabling communication between the number of end points; accessing a number of policies, each policy associated with an end point profile; and responsive to determining the number of tasks, the number of end points, and the number of policies, scheduling the number of tasks at the number of end points in accordance with the number of policies.

In an embodiment, an apparatus comprises a collaborative service platform connected to a registry, a number of customers, a number of manufacturers, a number of suppliers, and a number of businesses; a service orchestration engine in the collaborative service platform, the service orchestration engine configured to perform actions comprising: providing a number of service definitions in a registry connected to a platform; responsive to receiving a request for a service at the platform, identifying a service definition in a registry; responsive to identifying the service definition, accessing the service definition to determine a number of tasks and a number of end points, each of the number of end points having an end point profile; accessing a number of end point profiles, and responsive to a number of data in the end point profiles, enabling communication between the number of end points; accessing a number of policies, each policy associated with an end point profile; and responsive to determining the number of tasks, the number of end points, and the number of policies, scheduling the number of tasks at the number of end points in accordance with the number of policies.

In an embodiment, a program product comprises a computer readable storage medium; a number of instructions stored in the computer readable storage medium, the number of instructions configured to cause a processor of a computer to perform actions comprising: providing a number of service definitions in a registry connected to a platform; responsive to receiving a request for a service at the platform, identifying a service definition in a registry; responsive to identifying the service definition, accessing the service definition to determine a number of tasks and a number of end points, each of the number of end points having an end point profile; accessing a number of end point profiles, and responsive to a number of data in the end point profiles, enabling communication between the number of end points; accessing a number of policies, each policy associated with an end point profile; and responsive to determining the number of tasks, the number of end points, and the number of policies, scheduling the number of tasks at the number of end points in accordance with the number of policies.

DETAILED DESCRIPTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the computer-readable storage medium.

Any combination of one or more computer-usable or computer-readable storage medium(s) may be utilized. The computer-usable or computer-readable storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium or computer-readable storage device may be any medium that can, store the program for use by or in connection with the instruction run system, apparatus, or device, but does not encompass a signal propagation medium. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Java is a trademark of Sun Microsystems, Inc. in the United States, other countries, or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
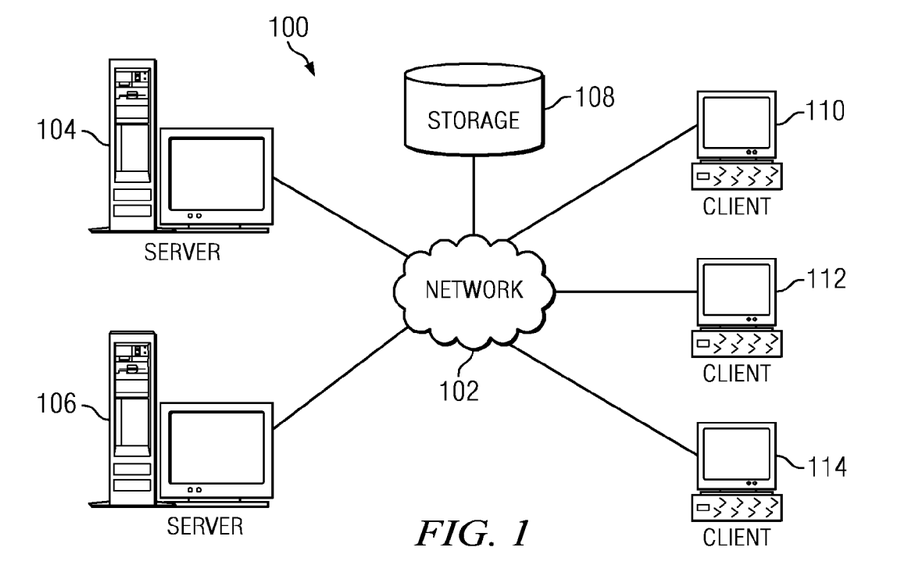
FIG. 1 is a computer network in which illustrative embodiments may be implemented.
Figure 2:
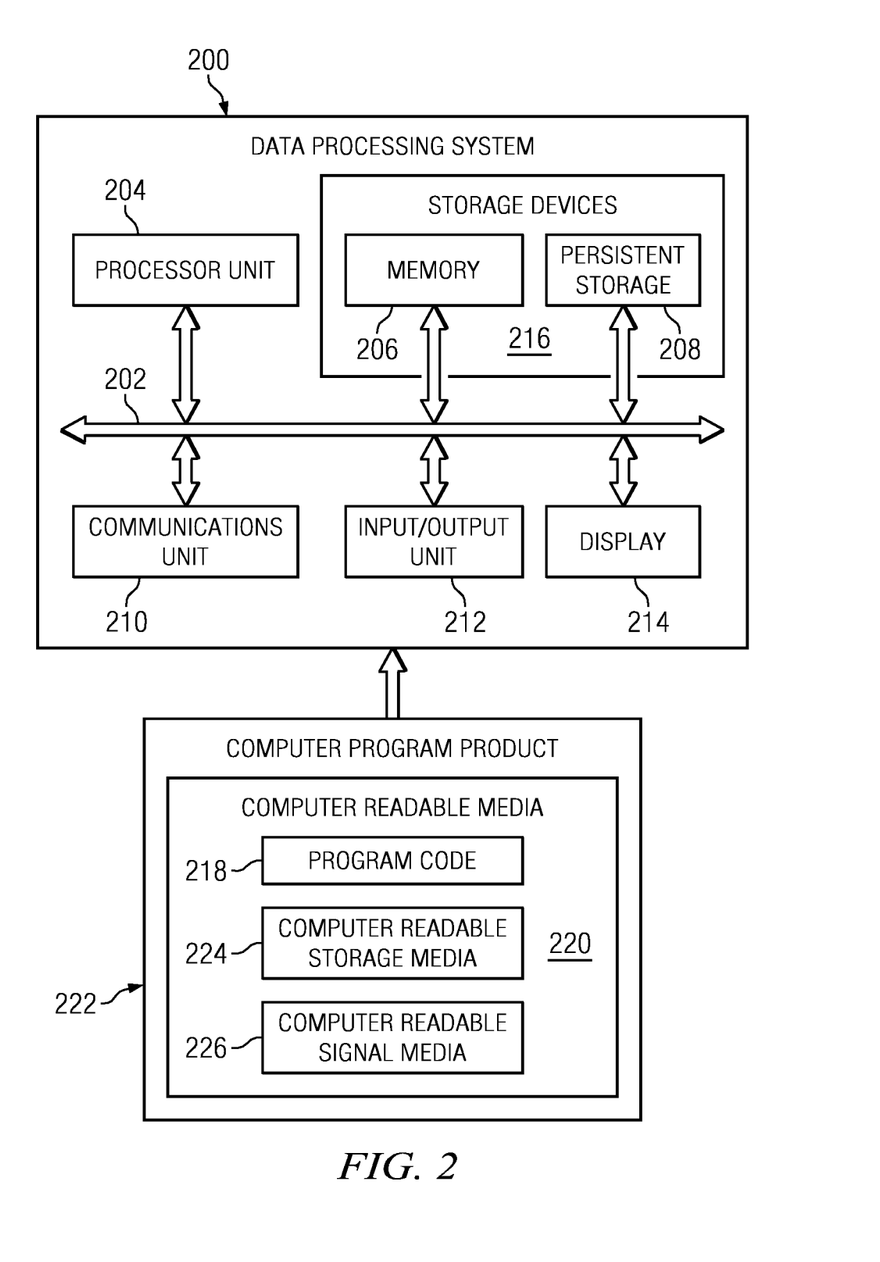
FIG. 2 is a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments. As used herein, a number of items means one or more items.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors, or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communication links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code, that may be read and run by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
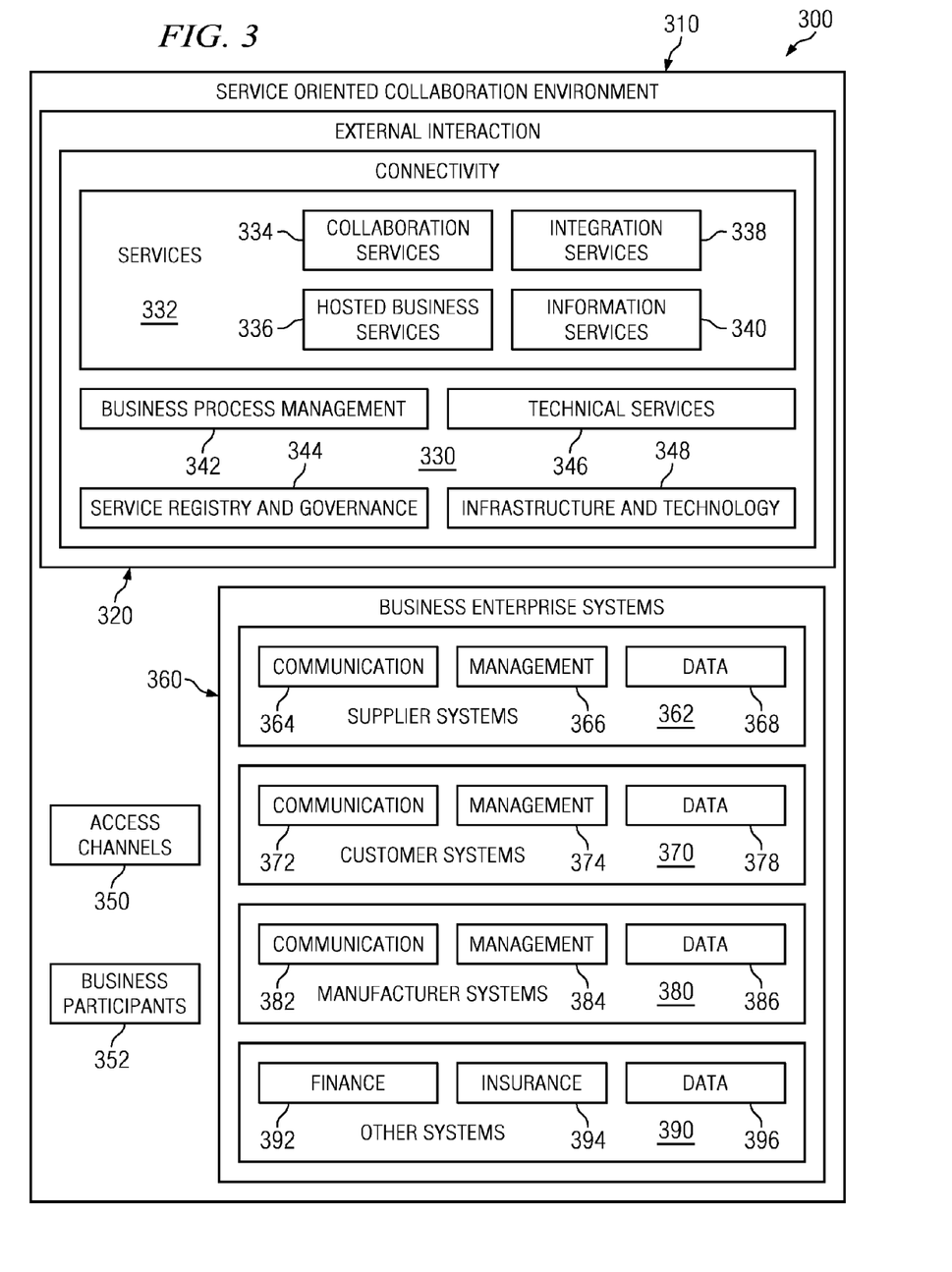
FIG. 3 is an environment providing a service oriented collaboration environment in which illustrative embodiments may be implemented.

FIG. 3 is an environment providing a service oriented collaboration environment. Environment 300 may be any environment having a communications infrastructure configured to support communications between individuals and businesses, between businesses and businesses, and between customers, businesses and third parties. Service oriented collaboration environment 310 may be an environment configured to support service oriented collaboration providing external interaction 320 for a number of service oriented collaboration components connected by connectivity 330. Service oriented collaboration components may include services 332, business process management 342, service registry and governance 344, technical services 346, and infrastructure and technology 348. Services 332 may include collaboration services 334, integration services 338, hosted business services 336, and information services 340. External interaction 320 may include web services, portal services, wireless services, and other interaction services. In addition, external interaction 320 may include external systems and gateway services.

External interaction 320 connects service oriented collaboration components with access channels 350 and business participants 352. Access channels 350 may include, without limitation, printers for messaging systems, browsers, email, hand-held communication devices, and interface terminals. Business participants 352 may include, without limitation, dealers, original equipment manufacturers (OEM), consumers, vendors, and other systems. External interaction 320 further connects external partners and customers such as business enterprise systems 360. Business enterprise systems 360 may have supplier systems 362, customer systems 370, manufacturer systems 380, and other systems 390. Supplier systems 362 may include communication systems 364, management systems 366, and data systems 368. Customer systems 370 may include communications 372, management systems 374 and data systems 378. Manufacturer systems 380 may include communications systems 382, management systems 384, and data systems 386. Other systems may include finance systems 392, insurance systems 394, and data systems 396.

Figure 4:
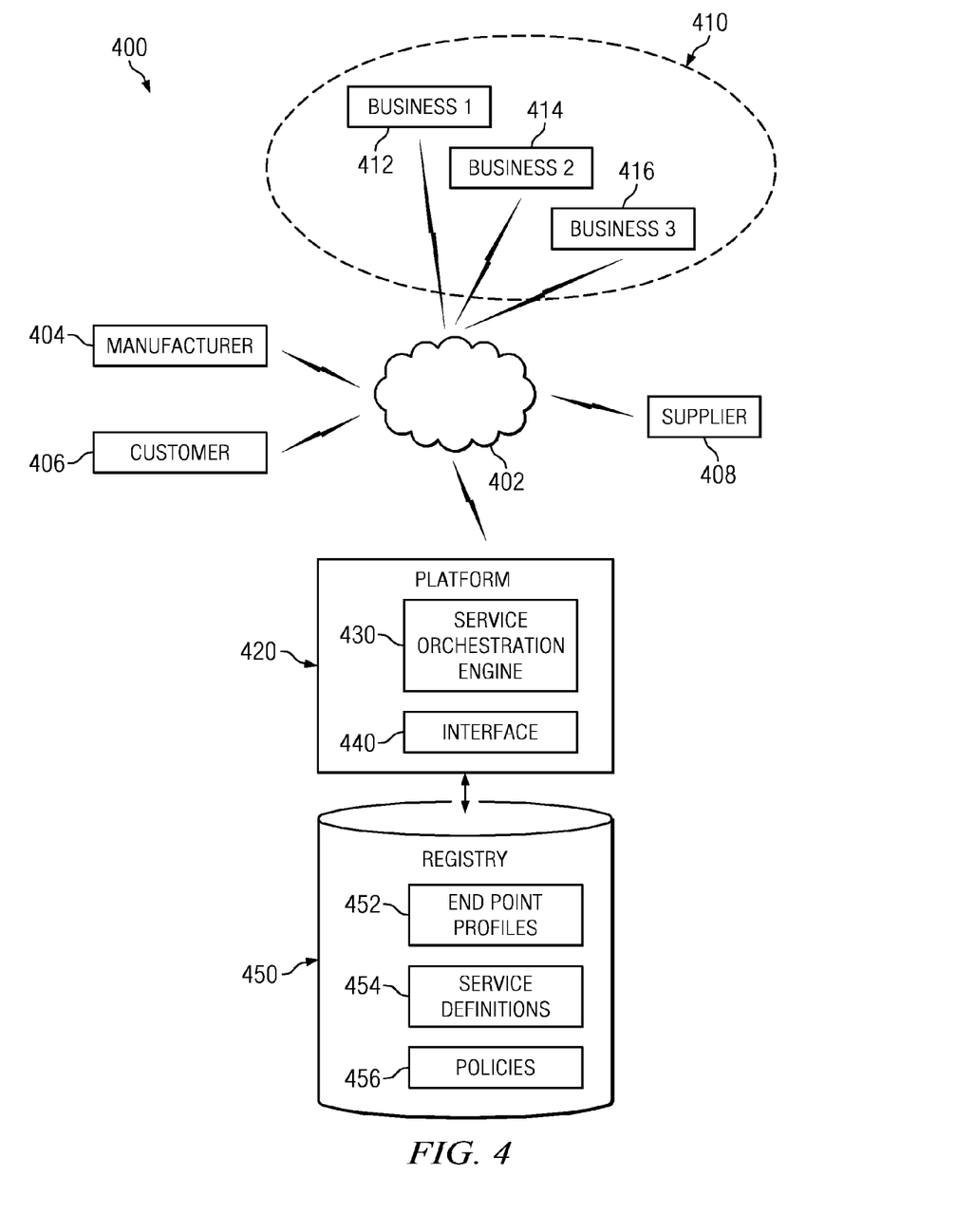
FIG. 4 is a service oriented collaboration network in which illustrative embodiments may be implemented.

FIG. 4 is collaboration service network 400. Collaboration service network 400 has a number of businesses such as business 1 412, business 2 414, and business 3 416, a number of manufacturers such as manufacturer 404, a number of customers such as customer 406, and a number of suppliers such as supplier 408. Business 1 412, business 2 414 and business 3 416 may be related group of business 410. In an embodiment, supplier 408 may be a supplier system such as supplier systems 362 in FIG. 3. In an embodiment, supplier 408 may be an original equipment manufacturer. A collaborative service may be requested by customer 406, manufacturer 404, supplier 408, or one of businesses 412-416. When a collaborative service request is sent to platform 420, service orchestration engine 430 accesses registry 450 to identify appropriate end point profiles in end point profiles 452, service definitions in service definitions 454, and policies in policies 456 in order to assemble and orchestrate a collaborative service in response to the request. In an embodiment, registry 450 may be incorporated into service registry and governance 342 of service oriented collaboration environment 310. In an embodiment, registry 450 may be a stand-alone registry connected directly to service orchestration engine 430 of platform 420. In an embodiment registry 450 may be accessed by interface 440. In an embodiment, end point profiles 452 contain profiles for each end point available to provide services in accordance with service definitions 454 and policies 456.

Each profile contains information regarding a particular end point's communication systems, management systems, and data systems. Information regarding an end point's communication systems may include information regarding telephone numbers, email addresses, calendaring systems and so forth. In addition, information regarding an end point's communication systems may include the end point's social networking tools such as social networking profiles, communities, blogs, bookmarking, and activities. The end point profiles provide information that can be used in carrying out a number of tasks as part of a service definition. Platform 420 may be connected to registry 450. Platform 420 may be connected to group of businesses 410, manufacturer 404, customer 405, and supplier 408 by network 402. In an embodiment, network 402 may be a cloud computing environment. In an embodiment, network 402 may be the Internet. In an embodiment, network 402 may be a network such as computer network 100 of FIG. 1. In an embodiment, service orchestration engine 430 may be hardware, software, or a combination of hardware and software. In an embodiment, service orchestration engine 430 may be a data processing system such as data processing system 200 in FIG. 2.

In an embodiment, each end point profile may be associated with a policy such as policies in policies 456. Service definitions 454 may contain a number of tasks and instructions to enable service orchestration engine 430 to assemble a number of tasks from a number of service definitions, to schedule the number of tasks and to monitor the number of tasks for completion in order to provide a particular collaborative service. In an embodiment, service definitions 454 may provide a link or pointer to a file or table containing a number of tasks. Service definitions 454 may also reference a number of end points for each of the one or more tasks. In an embodiment, service definitions 454 may provide a link or pointer to a file or table containing a number of end points. Policies 456 provide a number of instructions to enable service orchestration engine 430 to coordinate communications between end points based on the information regarding communication systems in the end point profiles, to provide instructions on resolving scheduling conflicts, to provide other instructions agreed upon by participating end points, and to provide security for access to registry 450 through interface 440 of platform 420. In an embodiment, each policy may be associated with an end point profile, such as end point profiles in end point profiles 452. Thus, in FIG. 4, manufacturer 404, customer 406, supplier 408, and a number of businesses such as business 412-416 may collaborate through platform 420 to provide a service defined by a service definition from service definitions 454 of registry 450. Manufacturer 404, customer 406, supplier 408, and businesses 412-416 may each have a profile in end point profiles 452.

Figure 5:
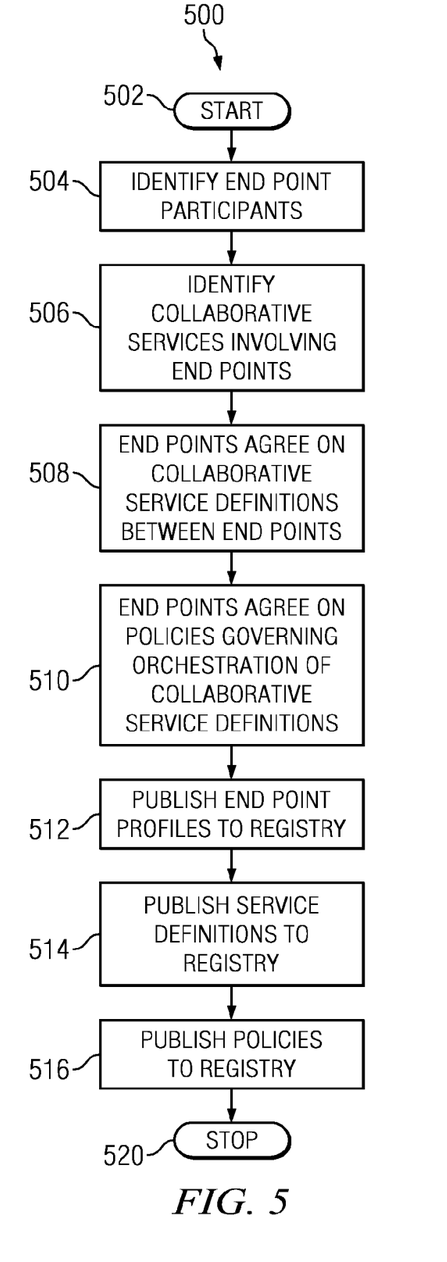
FIG. 5 is a flowchart of a registry publication process in accordance with the illustrative embodiments.

FIG. 5 is a flowchart of a registry publication process. Registry publication process 500 starts (step 502) and identifies all end point participants in a collaborative services environment (step 504). Registry publication process 500 defines collaborative services involving the end point participants and policies governing orchestration of the collaborative services (step 506). As used herein, the term "orchestration" means scheduling a number of tasks contained in a service definition in accordance with a number of policies, each policy associated with an end point. Registry publication process obtains agreement from each participating end point as to the definitions and policies (step 508). Registry publication process 500 publishes end points to the registry (step 512). Registry publication process publishes the definitions (step 514) and policies (step 516) to the registry and stops (step 520). In an embodiment, registry publication process 500 may be enabled by interface 440 of platform 420 in FIG. 4. In an embodiment, the process of agreement on service definitions may be automated through an interface such as interface 440 or some other interface.

In an embodiment, service orchestration engine 430 may monitor interface 440 for changes to the number of policies, to the number of service definitions, and to the number of end point profiles. In an embodiment, interface 440 may be configured to receive updates to the number of policies, the number of service definitions, and the number of end point profiles. In an embodiment, platform 420 may be integrated into service oriented collaboration environment 310 so that service orchestration engine 430, based on an end point profile from end point profiles 452, accesses a number of communications systems such as 364, 372, 382, and 392, a number of management systems such as 366, 374, 384, and 394, and a number of data systems such as 362, 378, 386, and 396 in services oriented collaboration environment 310. In an embodiment, platform 420 may be integrated into the service oriented collaboration environment 310 so that service orchestration engine 430, based on an end point profile from end point profiles 452, accesses a number of access channels such as access channels 350 and a number of business participants such as business participants 352.

Figure 6:
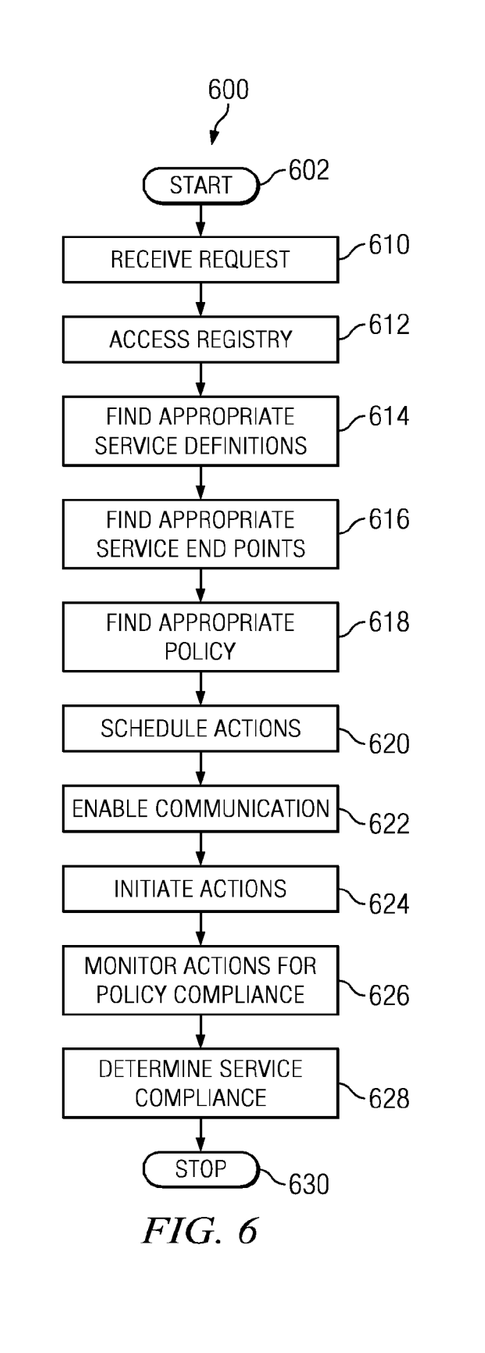
FIG. 6 is a flowchart of a collaboration service engine in accordance with the illustrative embodiments.

FIG. 6 is a flowchart of an engine 600. Engine 600 may be a service orchestration engine such as service orchestration engine 430 in FIG. 4. Engine 600 starts (step 602) and receives a request for a collaborative service (step 610). Engine 600 accesses registry 450 (step 612). Engine 600 finds, in registry 450, the appropriate service definitions for the request (step 614). Engine 600 finds, in registry 450, the appropriate end point profiles for the request (step 616). In an embodiment, end point profiles may be identified by a service definition. In an embodiment, a service definition may point to or provide a link to a file or table containing an end point profile. Engine 600 finds, in registry 450, the appropriate policy governing assembly and scheduling of the tasks in the service definitions (step 618). In an embodiment, a policy is located by association with an end point profile. In an embodiment, a data in an end point profile may link or point to a file or table containing a policy. Engine 600 schedules tasks at appropriate end points in accordance with the appropriate policy (step 620). In an embodiment, engine 600 may access information in data systems such as data systems 368, 378, 386, and 396 in FIG. 3. Engine 600 enables communications between end points (step 622), and initiates tasks (step 624). In an embodiment, engine 600 may access communications systems such as 364, 372, 382, and 392 in FIG. 3. Engine 600 monitors the tasks for policy compliance (step 626). In an embodiment, engine 600 may access management systems such as 366, 374, 384, and 394 in FIG. 3 and data systems such as data systems 368, 378, 386, and 396 in FIG. 3. Engine 600 determines service compliance (step 628) and stops (step 630).

In an embodiment, service orchestration engine 600 of FIG. 6 is employed in a collaborative service environment for car dealerships and customers of the car dealerships. The car dealerships and customers may be in service oriented collaboration environment 310 of environment 300 in FIG. 3. The car dealerships and customers may have agreed on collaborative services for access as collaboration services 334 in services 332 of environment 300 in FIG. 3. In an embodiment, customers and dealerships may have agreed upon services in accordance with registry publication process 500 of FIG. 5 where dealerships and customers agreed to be identified as end points, provide end point profiles, agree to service definitions, and agree to use interface 440 of platform 420 in FIG. 4. A customer, who has purchased a vehicle from one of the car dealerships, may start his or her car. The customer may be customer 406 of FIG. 4. The car may transmit its current mileage to the collaborative service environment for processing by a platform such as platform 420. The customer may have agreed to be an end point, to supply an end point profile and to supply or agree to a service definition where service may be performed by a preferred dealer in accordance with a vehicle maintenance schedule from an original equipment manufacturer. The car mileage data may be received at the platform 420, and the data may be interpreted as a request for a collaborative service. Engine 600 accesses registry 450 and finds the appropriate service definition. In an embodiment, the collaborative service may be scheduling maintenance for the customer's vehicle. The service definition may contain a number of tasks for retrieving the maintenance service schedule for the customer's car from the original equipment manufacturer and to get the maintenance scheduled for the user. The request may inform the engine 600 of the user's location. In an embodiment, the user may have driven the car to a different location from where the user resides. Alternatively, the request may be coming from the car parked where the user resides. The request may be transmitted from the car and a location may also be transmitted so that car location will be included in the request. Thus, the request may inform engine 600 of a specific service definition to select. The engine mileage may be set to trigger a maintenance request in accordance with a service definition. Engine 600 accesses registry 450 (step 612). Engine 600 finds, in registry 450, the appropriate service definitions for the request (step 614). Engine 600 finds, in registry 450, the appropriate service end point profiles for the request (step 616). In an embodiment, the service engine may find the appropriate end point profiles for the customer, a preferred dealer and the original equipment manufacturer. Engine 600 finds, in registry 450, the appropriate policy or policies governing assembly and scheduling of the tasks in the service definition (step 618). The service definition may inform the engine 600 of the tasks to be performed and the type of end points required. In an embodiment, the appropriate end points may be a preferred dealer and the original equipment manufacturer. Alternatively, the preferred dealer may be a dealer in the state in which the traveling user is currently located. Engine 600 schedules tasks in accordance with the service definition (step 620). Engine 600 enables communications between end points (step 622), and initiates tasks (step 624). Engine 600 enables communication by accessing end point profiles to obtain information about each end point's communication resources. The task to be scheduled may be the following. The next service and the corresponding mileage may be determined from the maintenance service schedule. Based on the current mileage and the mileage history of earlier transmitted data, the next service date may be estimated. If the estimated date is close to the current date, an attempt to plan a provisional service may be made at the preferred dealer. The customer's preferred dealer may be retrieved at the original equipment manufacturer. A provisional service may be planned at the preferred dealer. The details of the provisional service may be transmitted back to the car. The customer may be asked for a confirmation of the planned provisional service. If the customer does not want the planned provisional service, the customer may go on line in the collaboration service environment. An alternate dealer or time slot may be determined for the next maintenance service. The customer may be satisfied with one of the alternatives, and a definite maintenance service may be planned at the designated dealer. All of the foregoing tasks may be scheduled by engine 600. Engine 600 monitors the tasks for policy compliance (step 626). Engine 600 determines service compliance (step 628) and stops (step 630).

In another embodiment, engine 600 of FIG. 6 is employed in a collaborative service environment for car dealerships. A collaborative service environment may offer a service for customers to search for pre-owned cars of one particular brand that are certified by dealers of that one brand. In an embodiment, the customer may search for a car of that brand at other sources such as a non-dealer source. Thus, when a customer enters a search criteria, the search may be treated as a request for a collaborative service, and engine 600 accesses registry 450. Engine 600 finds, in registry 450, the appropriate service definition for the request (step 614). Engine 600 finds, in registry 450, the appropriate service end point profiles for the request (step 616). Engine 600 finds, in registry 450, the appropriate policy governing assembly and scheduling of the tasks in the service definitions (step 618). Engine 600 schedules tasks at the appropriate end points in accordance with the policy (step 620). Engine 600 enables communications between end points (step 622), and initiates tasks (step 624). Tasks may be as follows. The desired car may be searched for at the associated dealers, and the results from this inquiry may be labeled as certified cars guaranteed by the dealer, or the original equipment manufacturer. Other non-dealer sources may be queried for availability of the car matching the customer's search criteria. Search results from non-dealer sources may be labeled as regular. The search results may be presented to the customer in a display. The display may include maps showing the locations of the found cars or the location of the dealer that sells the car. The customer may be interested in one of the certified cars, and the customer may indicate his or her interest. One way of indicating interest may be completing a pre-owned car interest form. The form may be submitted to the service oriented collaboration environment. The dealer selling the car may be notified of the customer interest. Engine 600 monitors the tasks for policy compliance (step 626). Engine 600 determines service compliance (step 628) and stops (step 630).

In a further embodiment, the service orchestration engine of FIG. 6 is employed in a collaborative service environment. In the collaborative service environment, a customer may be searching for a specific new car at a neighborhood dealer. The customer may want a car with certain options. The customer may ask his preferred dealer whether the car with the certain options is in stock. The dealer may not have the car with the certain options in stock. The dealer may make a request to the service oriented collaboration environment. Engine 600 starts (step 602) and receives a request for a collaborative service (step 610). Engine 600 accesses registry 450 (step 612). Engine 600 finds, in registry 450, the appropriate service definitions for the request (step 614). Engine 600 finds, in registry 450, the appropriate service end point profiles for the request (step 616). Engine 600 finds, in registry 450, the appropriate policy governing assembly and scheduling of the tasks at the appropriate end points in the service definitions (step 618). Engine 600 schedules tasks in accordance with the policy definition (step 620). Engine 600 enables communications between end points (step 622), and initiates tasks (step 624). The searched car may be checked for availability at the original equipment manufacture's location. Neighboring dealers may be queried for the searched car with the specific options. When making his or her request, the dealer may state the radius of search. A result may be obtained showing vehicles with the certain options at the original equipment manufacturer and at the neighboring dealers within a certain radius. The result may be supported by maps. The dealer may approach a neighboring dealer and may obtain the car with the certain options from the neighboring dealer. The searched car may be delivered to the customer by his preferred dealer. Engine 600 monitors the actions for policy compliance (step 626). Engine 600 determines service compliance (step 628) and stops (step 680).

In each of the forgoing examples, certain disadvantages are overcome by collaborative service environment, engine 600 and registry 450. There may be no standardization over the interfaces with the other parties. The data and processing may be distributed resulting in communication overhead, complex security and complex governance. Parties may find that collaboration between two parties is difficult to get operational on their own. Parties find that there is no direct need to be compliant with industry standards. Infrastructures can be duplicated at both ends of the point-to-point interfaces. The service oriented collaboration platform overcomes these disadvantages by providing a single collaborative platform using the engine and registry.

According to one embodiment of the present invention, a method comprises: providing a number of service definitions in a registry connected to a platform; responsive to receiving a request for a service at the platform, identifying a service definition in a registry; responsive to identifying the service definition, accessing the service definition to determine a number of tasks and a number of end points, each of the number of end points having an end point profile; accessing a number of end point profiles, and responsive to a number of data in the end point profiles, enabling communication between the number of end points; accessing a number of policies, each policy associated with an end point profile; and responsive to determining the number of tasks, the number of end points, and the number of policies, scheduling the number of tasks at the number of end points in accordance with the number of policies.

In an embodiment, an apparatus comprises a collaborative service platform connected to a registry, a number of customers, a number of manufacturers, a number of suppliers, and a number of businesses; a service orchestration engine in the collaborative service platform, the service orchestration engine configured to perform actions comprising: providing a number of service definitions in a registry connected to a platform; responsive to receiving a request for a service at the platform, identifying a service definition in a registry; responsive to identifying the service definition, accessing the service definition to determine a number of tasks and a number of end points, each of the number of end points having an end point profile; accessing a number of end point profiles, and responsive to a number of data in the end point profiles, enabling communication between the number of end points; accessing a number of policies, each policy associated with an end point profile; and responsive to determining the number of tasks, the number of end points, and the number of policies, scheduling the number of tasks at the number of end points in accordance with the number of policies.

In an embodiment, a program product comprises a computer readable storage medium; a number of instructions stored in the computer readable storage medium, the number of instructions configured to cause a processor of a computer to perform actions comprising: providing a number of service definitions in a registry connected to a platform; responsive to receiving a request for a service at the platform, identifying a service definition in a registry; responsive to identifying the service definition, accessing the service definition to determine a number of tasks and a number of end points, each of the number of end points having an end point profile; accessing a number of end point profiles, and responsive to a number of data in the end point profiles, enabling communication between the number of end points; accessing a number of policies, each policy associated with an end point profile; and responsive to determining the number of tasks, the number of end points, and the number of policies, scheduling the number of tasks at the number of end points in accordance with the number of policies.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage medium providing program code for use by or in connection with a computer or any instruction run system. For the purposes of this description, a computer-usable or computer-readable storage medium or computer-readable storage device can be any tangible apparatus that can store the program for use by or in connection with the instruction run system, apparatus, or device, but does not encompass a signal propagation medium.

The computer-readable storage medium can be an electronic, magnetic, optical, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk, but does not encompass a signal propagation medium. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing a collaborative service, the method comprising:
    identifying, by a computer, a plurality of data processing system end points associated with the collaborative service, wherein first portions of the plurality of data processing system end points are located in respective vehicles and second portions of the plurality of data processing end points are located at each of a plurality of respective service providers for the vehicles;

obtaining, by the computer, an agreement from each of the plurality of data processing system end points on (a) a service definition that corresponds to the collaborative service and specifies tasks and the plurality of data processing system end points associated with the collaborative service, and (b) a plurality of policies that govern scheduling of tasks corresponding to the service definition;

responsive to and based on (i) data corresponding to the collaborative service received from a first portion of one of the data processing system end points located in a vehicle and (ii) data identifying a geographic location of the vehicle, determining, by the computer, the tasks to be performed and the plurality of data processing system end points each having a second portion located at the plurality of service providers for the vehicle including each of a manufacturer, a dealer, a supplier, and a number of businesses;

responsive to the computer determining the tasks, the plurality of data processing system end points, and the plurality of policies for the collaborative service, assembling, orchestrating, and scheduling, by the computer, a service at the plurality of service providers for the vehicle including each of the manufacturer, the dealer, the supplier, and the number of businesses to perform the tasks corresponding to the service definition in accordance with the plurality of policies that govern the scheduling of the tasks;

transmitting, by the computer, criteria for the service scheduled at the plurality of service providers to the first portion of the one data processing system end points located in the vehicle along with a request to confirm the service; and responsive to the computer receiving an indication that the criteria for the service scheduled at the plurality of service providers are not accepted, transmitting, by the computer, at least one of alternative service providers and a modification to the criteria for the service to the first portion of the one data processing system end points located in the vehicle.

2. The method of claim 1, further comprising:
publishing, by the computer, the service definition to a registry.

3. The method of claim 1, further comprising:
publishing, by the computer, the plurality of policies to a registry.

4. The method of claim 1, further comprising:
monitoring, by the computer, the tasks for compliance with the plurality of policies.

5. The method of claim 1, wherein the computer is integrated into a service oriented collaboration environment so that the computer, based on an end point profile, accesses a number of communications systems, a number of management systems, and a number of data systems in the service oriented collaboration environment.

6. The method of claim 5, wherein the computer is integrated into the service oriented collaboration environment so that the computer, based on the end point profile, accesses a number of access channels and a number of business participants.

7. The method of claim 1, wherein the criteria for the service are details corresponding to the service scheduled at the plurality of service providers.

8. A computer system for providing a collaborative service, the computer system comprising:

one or more processors, one or more computer-readable memories, and one or more computer-readable tangible storage devices, and program instructions, stored on at least one of the one or more storage devices for execution by at least one of the one or more processors via at least one of the one or more memories, the program instructions comprising:

program instructions to identify a plurality of data processing system end points associated with the collaborative service, wherein first portions of the plurality of data processing system end points are located in respective vehicles and second portions of the plurality of data processing end points are located at each of a plurality of respective service providers for the vehicles;

program instructions to obtain an agreement from each of the plurality of data processing system end points on (a) a service definition that corresponds to the collaborative service and specifies tasks and the plurality of data processing system end points associated with the collaborative service, and (b) a plurality of policies that govern scheduling of tasks corresponding to the service definition;

program instructions, responsive to and based on (i) data corresponding to the collaborative service received from a first portion of one of the data processing system end points located in a vehicle and (ii) data identifying a geographic location of the vehicle, to determine the tasks to be performed and the plurality of data processing system end points each having a second portion located at the plurality of service providers for the vehicle including each of a manufacturer, a dealer, a supplier, and a number of businesses;

program instructions, responsive to determining the tasks, the plurality of data processing system end points, and the plurality of policies for the collaborative service, to assemble, orchestrate, and schedule a service at the plurality of service providers for the vehicle including each of the manufacturer, the dealer, the supplier, and the number of businesses to perform the tasks corresponding to the service definition in accordance with the plurality of policies that govern the scheduling of the tasks;

program instructions to transmit criteria for the service scheduled at the plurality of service providers to the first portion of the one data processing system end points located in the vehicle along with a request to confirm the service; and program instructions, responsive to receiving an indication that the criteria for the service scheduled at the plurality of service providers are not accepted, to transmit at least one of alternative service providers and a modification to the criteria for the service to the first portion of the one data processing system end points located in the vehicle.

9. The computer system of claim 8, further comprising:
program instructions to publish the service definition to a registry.

10. The computer system of claim 8, further comprising:
program instructions to publish the plurality of policies to a registry.

11. The computer system of claim 8, further comprising:
program instructions to monitor the tasks for compliance with the plurality of policies.

12. The computer system of claim 8, wherein the computer system is integrated into a service oriented collaboration environment so that the computer system, based on an end point profile, accesses a number of communications systems, a number of management systems, and a number of data systems in the service oriented collaboration environment.

13. The computer system of claim 12, wherein the computer system is integrated into the service oriented collaboration environment so that the computer system, based on the end point profile, accesses a number of access channels and a number of business participants.

14. A computer program product for providing a collaborative service, the computer program product comprising:
one or more computer-readable storage devices and program instructions, stored on at least one of the one or more computer-readable storage devices, the program instructions comprising:
program instructions to identify a plurality of data processing system end points associated with the collaborative service, wherein first portions of the plurality of data processing system end points are located in respective vehicles and second portions of the plurality of data processing end points are located at each of a plurality of respective service providers for the vehicles;
program instructions to obtain an agreement from each of the plurality of data processing system end points on (a) a service definition that corresponds to the collaborative service and specifies tasks and the plurality of data processing system end points associated with the collaborative service, and (b) a plurality of policies that govern scheduling of tasks corresponding to the service definition;
program instructions, responsive to and based on (i) data corresponding to the collaborative service received from a first portion of one of the data processing system end points located in a vehicle and (ii) data identifying a geographic location of the vehicle, to determine the tasks to be performed and the plurality of data processing system end points each having a second portion located at the plurality of service providers for the vehicle including each of a manufacturer, a dealer, a supplier, and a number of businesses;
program instructions, responsive to determining the tasks, the plurality of data processing system end points, and the plurality of policies for the collaborative service, to assemble, orchestrate, and schedule a service at the plurality of service providers for the vehicle including each of the manufacturer, the dealer, the supplier, and the number of businesses to perform the tasks corresponding to the service definition in accordance with the plurality of policies that govern the scheduling of the tasks;
program instructions to transmit criteria for the service scheduled at the plurality of service providers to the first portion of the one data processing system end points located in the vehicle along with a request to confirm the service; and
program instructions, responsive to receiving an indication that the criteria for the service scheduled at the plurality of service providers are not accepted, to transmit at least one of alternative service providers and a modification to the criteria for the service to the first portion of the one data processing system end points located in the vehicle.

15. The computer program product of claim 14, further comprising:
program instructions to publish the service definition to a registry.

16. The computer program product of claim 14, further comprising:
program instructions to publish the plurality of policies to a registry.

17. The computer program product of claim 14, further comprising:
program instructions to monitor the tasks for compliance with the plurality of policies.

18. The computer program product of claim 14, wherein the computer is integrated into a service oriented collaboration environment so that the computer, based on an end point profile, accesses a number of communications systems, a number of management systems, and a number of data systems in the service oriented collaboration environment.

19. The computer program product of claim 18, wherein the computer is integrated into the service oriented collaboration environment so that the computer, based on the end point profile, accesses a number of access channels and a number of business participants.

* * * * *